J. W. ELLIOTT.
Cotton-Planter.

No. 196,886.   Patented Nov. 6, 1877.

WITNESSES
E. H. Bates
George E. Upham

INVENTOR
James W. Elliott
Gilmore Smith & Co.
ATTORNEYS.

UNITED STATES PATENT OFFICE.

JAMES W. ELLIOTT, OF PIATTVILLE, ALABAMA.

IMPROVEMENT IN COTTON-PLANTERS.

Specification forming part of Letters Patent No. 196,886, dated November 6, 1877; application filed August 25, 1877.

*To all whom it may concern:*

Be it known that I, JAMES W. ELLIOTT, of Piattville, in the county of Autauga and State of Alabama, have invented a new and valuable Improvement in Cotton-Planters; and I do hereby declare that the following is a full, clear, and exact description of the construction and operation of the same, reference being had to the annexed drawings, making a part of this specification, and to the letters and figures of reference marked thereon.

Figure 1:
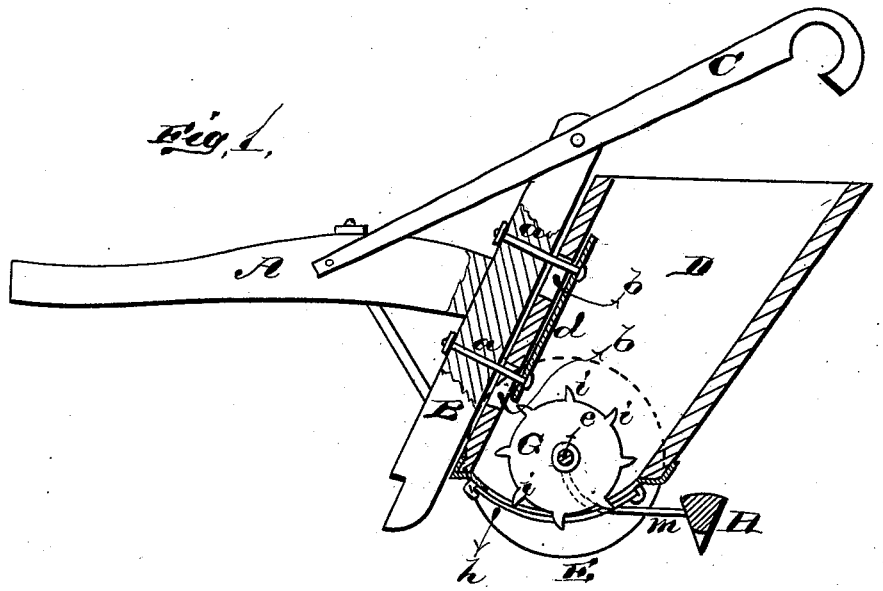
Figure 2:
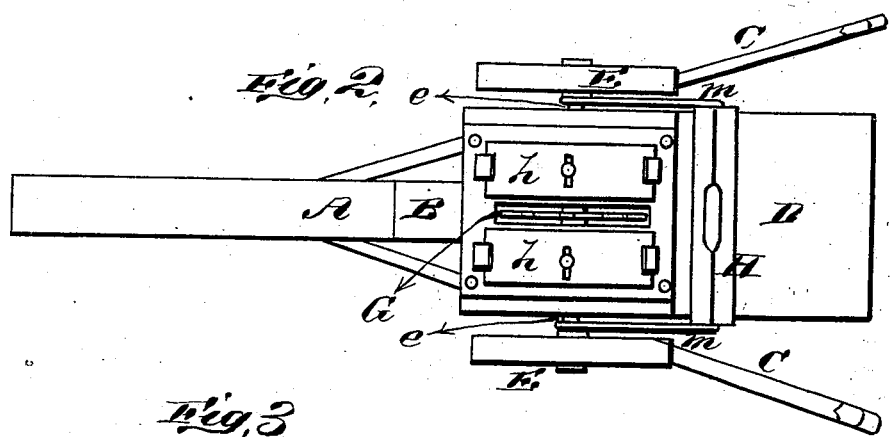
Figure 3:
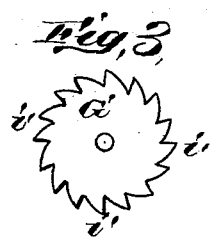

Figure 1 of the drawings is a representation of a longitudinal vertical sectional view of my cotton-planter. Fig. 2 is a bottom view thereof. Fig. 3 is a view of a saw.

The nature of my invention consists in the construction and arrangement of a cotton-planting attachment for plows, as will be hereinafter more fully set forth.

The annexed drawings, to which reference is made, fully illustrate my invention.

A represents the beam, B the plow-stock, and C C the handles, of an ordinary plow such as is commonly used for planting and cultivating cotton-crops. D is the hopper or seed-box, attached to the plow-stock B by two bolts, $a\,a$, fastened in the plow-stock, and passing through slots $b\,b$ in the front of the hopper. A metal plate, $d$, connects the two bolts inside the hopper and covers the slots. By this means the planter can move up and down and adjust itself to the land that is to be planted, and also to the depth that may be desired to let said plow go into the ground. In the bottom of the hopper is a shaft or axle, $e$, having a wheel, E, secured on each end. As the plow is pulled forward the wheels revolve and give motion to a saw, G, which is secured to the center of the shaft $e$. This saw has teeth $i$ cut on it, for the purpose of feeding the cotton-seed through the central opening in the concave bottom of the hopper. This opening may be adjusted to any size desired, for dropping more or less seed, by means of adjustable plates $h\,h$ underneath, as shown. H is a drag, attached to the axle $e$ by two rods, $m\,m$, to cover the seed as the machine drops it.

This machine is intended to sow seed in two ways. The saw G has the teeth $i$ wide apart, and drops the seed in bunches of about ten seed in a place, which saves chopping or blocking out the cotton after it comes up.

The saw G′ has a continuous series of teeth, $i'$, and, when that is used, sows the seed in a solid drill, as is done by the machines now ordinarily in use.

What I claim as new, and desire to secure by Letters Patent, is—

A cotton-seed hopper, D, attached to the plow-stock B by means of the bolts $a\,a$ fastened in said stock, and passing through slots $b\,b$ in the front portion of said hopper, and connected together by the plate $d$, as and for the purpose set forth.

In testimony that I claim the above I have hereunto subscribed my name in the presence of two witnesses.

JAMES W. ELLIOTT.

Witnesses:
 J. A. SMILEY,
 W. L. ELLIS.